Oct. 29, 1929.   J. B. GUERRA   1,733,874
BATTERY CHARGER
Filed Jan. 17, 1928
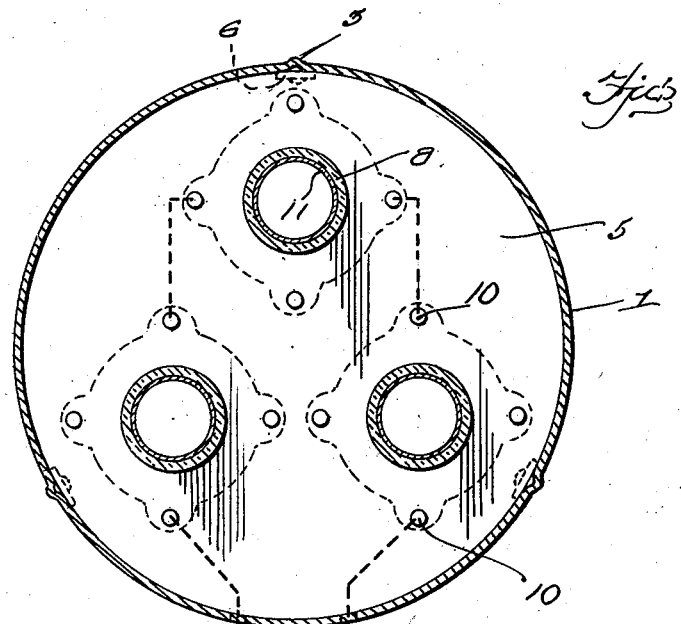
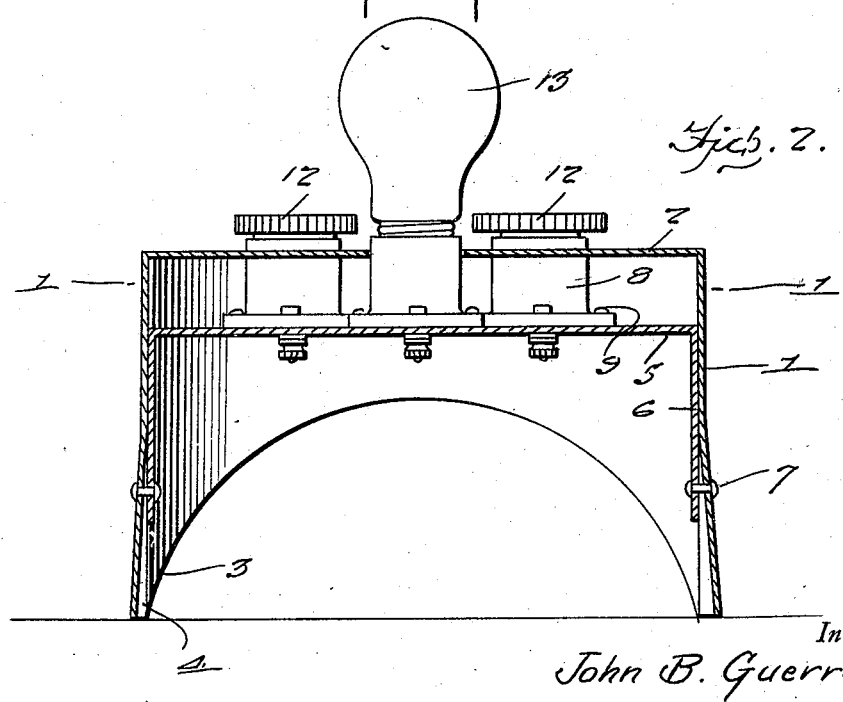
Inventor
John B. Guerra
By Clarence A. O'Brien
Attorney Patented Oct. 29, 1929

1,733,874

UNITED STATES PATENT OFFICE

JOHN BENIGNO GUERRA, OF CHICAGO, ILLINOIS

BATTERY CHARGER

Application filed January 17, 1928. Serial No. 247,359.

This invention pertains to improvements in storage battery chargers wherein a device is provided for charging storage batteries used in radio or automotive service, and which is particularly constructed in a manner to render the same of a very low cost, to manufacture.

The paramount purpose of this device is to provide a battery charger which will be equally efficient as those of a complex nature and of a cost derogative to the public demand.

There are numerous types of chargers offered on the market, but these are of such intricate construction and consequently of such a high cost of manufacture, as to prevent the more general and extensive use of the same.

The main object of this novel charger is realized from the fact that the same is of simple construction, thus rendering the same of low cost to manufacture, so that the same may be sold at a much lower consideration than those complex devices now on the market, and whereby the present device will be within the financial reach of a greater number of persons.

Another object is found in the provision made whereby the present construction is of such arrangement that the same may be quickly disassembled if desired.

Still another object resides in the fact that although the device is capable of ready disassembly, the various connections and adaptations of this device may be made without the necessity of removing any of the major parts thereof.

Certain other novel objects and advantages of this device will become apparent as the same is better understood from the following specification and claim.

In the drawings:—

Figure 1 represents a horizontal sectional view taken substantially on line 1—1 of Fig. 2, and Fig. 2 represents a vertical sectional view through the device and illustrating the manner of supporting the several socket members.

Now for a more detail description of the invention, reference is made to the drawings, wherein like numerals designate like parts. The construction of this novel charger includes a circular drum-like casing 1, which is closed at its top side 2, and formed with a suitable number of circular openings. The opposite end of the drum is formed with semi-circular indentures, each of which terminates in spaced relation with the extremity of the adjacent indentures, so as to provide a suitable number of supporting legs 3.

Each of these leg members is formed with a vertically extending and tapering corrugation 4, which corrugation is formed so as to reinforce and strengthen the same against distortion.

By this drum-like construction of the casing, as well as the strengthening provision of the legs, it is apparent that the same may be constructed of a very thin sheet metal.

A circular plate 5 is provided with a number of depending tongues 6, preferably of the same number, as there are legs formed of the drum 1. These tongues depend from the periphery of the plate and are adapted to engage snugly, the inner surface of the drum, in a manner clearly shown in Fig. 2. The lower end portion of each tongue is adapted to engage over the upper reduced end portion of the corrugations formed in each leg of the drum, while a rivet, or in fact any other securing means, as designated at 7, may be employed for securing the tongue at this point with the drum.

By this means, the plate 5 is disposed in a parallel spaced relation with the top 2 of the drum. A plurality of socket members 8 are arranged upon the plate in spaced relation and secured thereto by suitable means 9.

The socket members are substantially greater in elongation than the distance between the plate 5 and the top of the drum, so that when the plate is arranged in the position shown in Fig. 2, the respective socket members will project upwardly through the corresponding openings of the drum top. A pair of binding posts 10—10 depend below the plate and are in electrical connection with the metallic lining 11, of the socket.

These several socket members are interconnected in series by connector wires indicated in the drawings by dotted lines. The conductor wires may be enclosed within a heavy di-electric jacket.

In the charging of a standard battery, the battery to be charged is connected in series with the arrangement above set out. For the purpose of convenience, three socket members are shown in the drawing, but a greater number may be employed if found desirable, without departing from the spirit of the invention or the scope of the appended claim.

In two of the three sockets, shown in the drawing, fuse plugs 12 are disposed, while in the remaining socket an incandescent lamp 13 is threaded for electrical connection. This lamp may be of suitable candle power and voltage, while the respective fuses are of an amperage capacity, suitable for the purpose contemplated.

Obviously, in the charging of high potential batteries, a single incandescent lamp is employed as a resistance, while the pair of fuses protect the battery against being overcharged. However, when it is desired to charge the battery of lower potential, a greater resistance is afforded, by removing one of the fuses, and inserting a second lamp.

It will thus be seen that a device of this character is capable of being manufactured at a very low cost, the convenience of attaching the device being particularly notable in the adaptation of the same to various battery capacities.

Having thus described my invention, what I claim as new is:—

In a portable stand for supporting electrical devices comprising a tubular casing, closed at one end, said closed end being formed with an opening, a support arranged within the casing and adapted to support an electrical device, the opposite end of the casing being formed with semi-circular cut-out portions equally spaced about the periphery thereof to provide legs, each leg being formed longitudinally with a corrugation for strengthening the same.

In testimony whereof I affix my signature.

JOHN BENIGNO GUERRA.